United States Patent [19]
Brennan et al.

[11] Patent Number: 5,315,430
[45] Date of Patent: May 24, 1994

[54] STRAINED LAYER FABRY-PEROT DEVICE

[75] Inventors: Thomas M. Brennan; Ian J. Fritz, both of Albuquerque; Burrell E. Hammons, Tijeras, all of N. Mex.

[73] Assignee: The United States of America as represented by the United States Department of Energy, Washington, D.C.

[21] Appl. No.: 869,269

[22] Filed: Apr. 15, 1992

[51] Int. Cl.$^5$ .................. G02F 1/03; G02B 27/00; G02B 5/28
[52] U.S. Cl. ..................... 359/248; 359/260; 359/579; 359/589; 257/18; 257/28
[58] Field of Search ............... 359/245, 248, 260, 579, 359/589; 257/18, 28

[56] References Cited
FOREIGN PATENT DOCUMENTS

88/00358  1/1988  PCT Int'l Appl. ................. 359/248
2189619  10/1987  United Kingdom ................. 359/260

*Primary Examiner*—Loha Ben
*Assistant Examiner*—Evelyn A. Lester
*Attorney, Agent, or Firm*—George H. Libman; Gregory A. Cone

[57] ABSTRACT

An asymmetric Fabry-Perot reflectance modulator (AFPM) consists of an active region between top and bottom mirrors, the bottom mirror being affixed to a substrate by a buffer layer. The active region comprises a strained-layer region having a bandgap and thickness chosen for resonance at the Fabry-Perot frequency. The mirrors are lattice matched to the active region, and the buffer layer is lattice matched to the mirror at the interface. The device operates at wavelengths of commercially available semiconductor lasers.

15 Claims, 6 Drawing Sheets

TRANSMITTING INFORMATION TO THE MODULATOR

INITIAL PULSE ALERTS DETECTION CIRCUITRY
THAT cw-LIGHT BEAM IS COMING

AFTER AN APPROPRIATE DELAY, TRANSMIT CIRCUITRY
MODULATES cw-LIGHT BEAM TO ENCODE RETURNING
LIGHT WITH THE DESIRED INFORMATION

STRAINED LAYER FABRY-PEROT DEVICE

The United States Government has rights in this invention pursuant to Contract No. DE-AC04-76DP00789 between the Department of Energy and American Telephone and Telegraph Company.

BACKGROUND OF THE INVENTION

Optical devices can replace purely electronic components in communications and signal processing applications to enhance both the flexibility and performance of information systems. Replacement of electronic components by optical components motivates the modification of standard optical devices for enhanced performance in new applications.

An example of the modification of a standard optical device for novel applications involves the classical Fabry-Perot cavity. This device usually consists of an optical cavity formed by symmetric partially reflecting mirrors, and it is commonly used to define laser cavities (optical resonators) and for tunable spectrometers. A variation of the Fabry-Perot cavity has been designed by M. Whitehead, et al. (*Electronics Letters* 25, 566 (1989)); and fabricated by M. Whitehead, et al. (op. cit. 984), and also by R. H. Yan, et al., (Appl. Phys. Lett. 55, 1946 (1989)) to create an electrically controlled single-crystal Asymmetric Fabry-Perot (AFP) reflectance modulator.

The classical Fabry-Perot cavity has no reflection at those wavelengths for which the mirror spacing corresponds to an integral number of half wavelengths. Whitehead and Parry predicted, and their co-workers later demonstrated, that an electric field applied to a cavity which contained a multiple quantum-well (MQW) active region with an appropriate bandgap could produce large changes in the reflectivity of the Fabry-Perot resonator. These changes occur because the field shifts the MQW bandgap, thereby altering the wavelength-dependent absorption and the index of refraction of the active region. This bias-dependent modification of the bandgap occurs through the quantum-confined Stark effect. By electrically altering the properties of the optical cavity, the net reflectivity of the cavity is controled.

The Whitehead and Parry AFP modulator used doped semiconductor mirrors to form a p-i-n structure, so the required reverse bias could be applied to generate the necessary electric field across the quantum-well active region. Also, different periods of semiconductor dielectric mirrors are used to define a Fabry-Perot cavity with a different reflectivity for the top-surface mirror than for the bottom- surface mirror. Through the application of a reverse bias, the bandgap of the quantum wells is reduced, so that photons which previously penetrated the structure are absorbed. Thus, at the appropriate wavelength, the light reflected from the higher reflectivity bottom mirror can be attenuated until its reduced intensity matches that of the light reflected from the lesser reflectivity top mirror. For the proper mirror spacing at the appropriate wavelength, the light reflected from the bottom mirror will be 180 degrees out of phase with that from the top mirror, leading to an electrically controlled cancellation, and thus reduced reflectivity for an appropriate applied bias and cavity design.

The Whitehead and Parry Asymmetric Fabry-Perot device has been realized in AlGaAs/GaAs materials system by R. H. Yan et al., and also in the InGaAs/GaAs system by Pezeshki, et al., (Photonics Technology Letters, 2, 807 (1990)). The AlGaAs/GaAs devices of Whitehead, et al., and of Yan et al., are limited to operating wavelengths in a narrow (20 nm) band near 870 nm for room-temperature operation. Because the GaAs substrate is opaque at the quantum-well wavelengths, the AlGaAs/GaAs AFP devices mentioned above also exclude any applications which require light to be transmitted through the substrate.

The design of Pezeshki, et al. allows the use of wavelengths from 0.87 to 1.0 $\mu$m in an Asymmetric Fabry-Perot cavity structure. At these longer wavelengths the GaAs substrate is transparent. However, the manner in which Pezeshki, et al., strain the required, multiple layers of InGaAs to match the in-plane lattice spacing shared by the GaAs substrate and the GaAs and AlGaAs epitaxial layers results in a design that is not thermodynamically stable (e.g., G. A. Vawter and D. R. Myers (J. Appl. Phys., 65, 4769 (1990)). The metastable (i.e., not thermodynamically stable) Pezeshki design can only be realized by highly nonequilibrium growth, and degrades when exposed to energetic ions or to temperatures much above the growth temperature. Additionally, because even the most modern growth technique allows only finite deviations from the limits imposed by equilibrium thermodynamics, too great an indium mole fraction in the quantum wells will lead to dislocation formation during growth, thereby degrading the electrical performance, efficiency, and maximum reflectivity of the device. Pezeshki, et al. do not disclose a device that can operate at 1.06 $\mu$m and longer wavelengths.

SUMMARY OF THE INVENTION

It is an object of this invention to extend the operation of the Asymmetric Fabry-Perot reflection modulator to cover any wavelength selected from the entire range between 0.87 $\mu$m and 1.55 $\mu$m available from lattice-matched systems for room temperature operation.

It is another object of this invention to use lattice-mismatched quantum wells in a thermodynamically stable structure to design thermodynamically stable Asymmetric Fabry-Perot devices.

It is a further object of this invention to provide InGaAs quantum wells tailored for wavelengths produced by Nd:YAG lasers (near 1.06 $\mu$m).

It is still another object of this invention to combine strained-layer and lattice-matched epitaxy to extend the operating range of optoelectronic devices utilizing multilayer interference effects.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise an asymmetric Fabry-Perot reflectance modulator (AFPM) consisting of an active region between top and bottom mirrors, the bottom mirror being affixed to a substrate by a buffer layer, the modulator being formed only from ternary materials resulting from the combination of three binary materials, where at least two of the binary materials have different bandgaps, and the third material and at least one of the other binary materials have different lattice constants.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Modern epitaxial techniques allow growth of multilayer semiconductor structures with strong optical interference effects. Because many, relatively thick (>60 nm), layers are required to produce strong interference effects at wavelengths of interest for infrared applications (>800 nm), the in-plane lattice spacing of the multilayers must be matched to that of their underlying support layer to avoid device degradation from formation of misfit dislocations during growth, processing, or operation in harsh environments. This necessity for lattice matching limits the wavelengths available for optoelectronic device operation due to the limited range of bandgaps available in lattice-matched ternary semiconductor systems.

These optoelectronic devices need an active region whose bandgap is at or near the operating wavelength. The operation of these devices requires a bandgap energy at zero electric field which is just above the energy of the cavity resonance of the device. As discussed hereinafter, an applied electric field decreases the bandgap energy of the active region to change the absorption of the quantum wells, and thus the net reflectivity of the device.

Ternary composition, lattice-matched materials with appropriate bandgaps are not available except in the limited wavelengths region near 0.87 $\mu$m for AlGaAs/GaAs on GaAs substrates, or near 1.55 $\mu$m for InGaAs/InAlAs on InP substrates. Tailoring of semiconductor bandgaps over a wide range of wavelengths has been demonstrated using strained-layer epitaxy; however, strained-layer growth requires thin layers (<20 nm for mismatch of 1.16%) in order to avoid dislocation formation, an apparent bar to their incorporation into thick-layered interference structures. This invention combines lattice matched and lattice-mismatched growth to incorporate, in a single structure, both thick, strain-free multilayer interference stacks and strained-layer superlattice active regions with tailorable bandgaps. The general procedure is applicable to various types of devices and a wide range of operating wavelengths.

Figure 1:
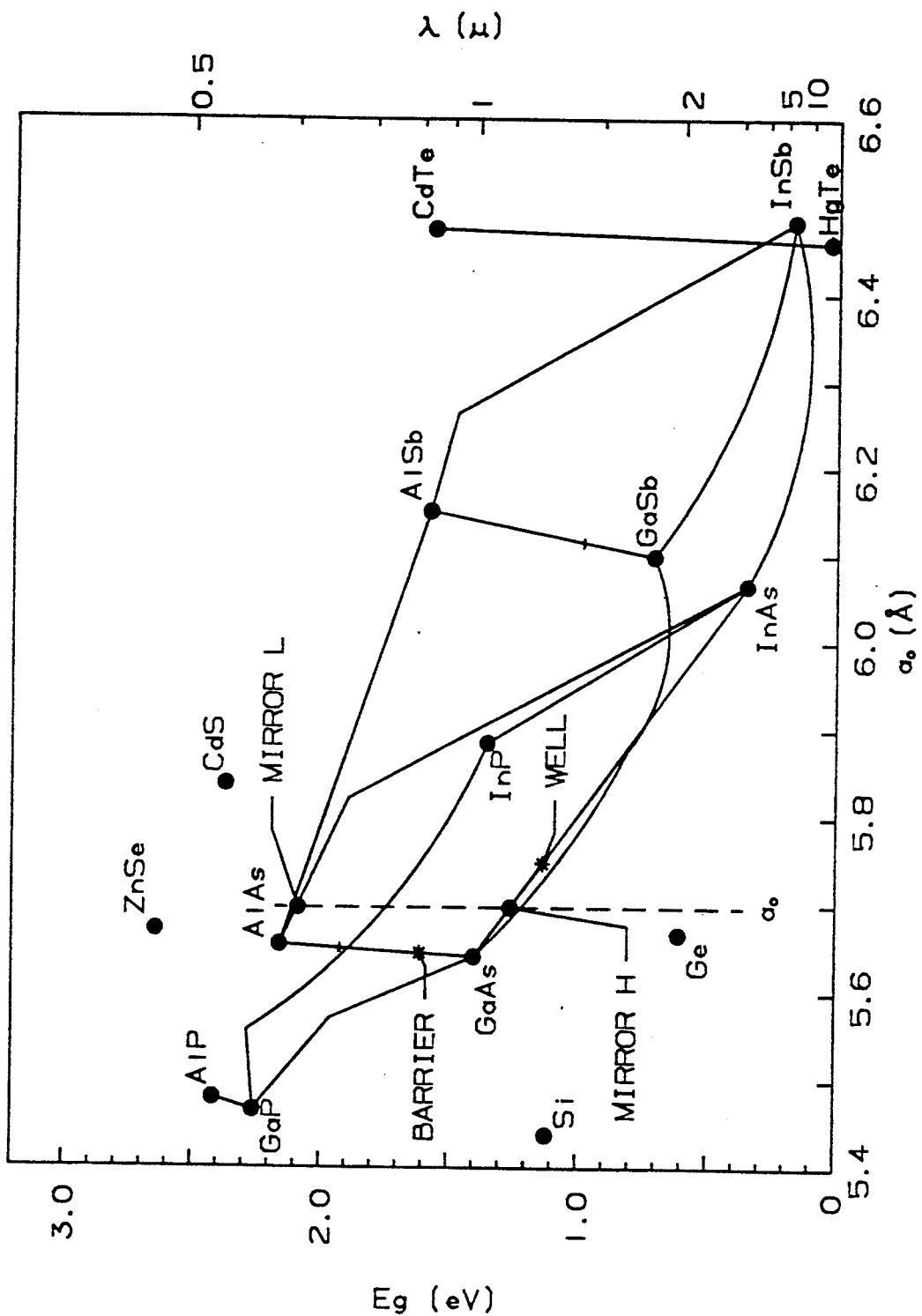
FIG. 1 discloses the relationship of lattice constant and bandgap for materials of the invention.

The general technique for constructing an AFP device in accordance with this invention can be understood from the schematic illustration of FIG. 1. First, the desired wavelength of operation is selected; 1.06 $\mu$m for this example. This frequency allows applications using commercially available Nd:YAG solid state lasers. Next, materials and thicknesses for the active region are chosen that will have a band gap corresponding to operation at this frequency. This selection is a recursive process that is known in the art. (I. J. Fritz, et al., Appl. Phys. Lett 57, 1245 (1990) or G. Ji et al., J. Appl. Phys. 62 (3366–73) 1987.) For 1.06 $\mu$m, an appropriate structure was determined to be a SLS cavity 10 consisting of 16 quantum well layers of 10 nm $In_{0.23}Ga_{0.77}As$ alternating with 15 barrier layers of 10 nm $Al_{0.35}Ga_{0.65}As$. The number of layers is selected in order to get the thickness of the cavity to a proper dimension to resonate at the desired frequency corresponding to 1.06 $\mu$m. These strained materials, in combination, have a lattice constant of 5.699 Å, represented as $a_0$ in FIG. 1.

The thickness of each of the individual layers in the active region is chosen to satisfy the critical thicknesses below which dislocation formation is not allowed by equilibrium thermodynamics. Because the layers of the active region alternate between the appropriate amounts of in-plane compressive strain and in-plane tensile strain, no net strain results on the structure, thereby assuring thermodynamic stability (Vawter and Myers reference).

To complete the device of the invention, upper 20 and lower 30 Fabry-Perot mirrors must surround cavity 10, and lower mirror 30 must connect to substrate 50 through a buffer layer 40. The lattice constant of both mirrors and of the buffer layer is designed to $a_0$, to match the lattice constant of active cavity 10.

Thick, strain-relieved, ternary buffer layer 40 is designed to also have lattice constant $a_0$, indicated by the dashed line. Realization of this strain-relieved buffer eliminates the requirement of matching the in-plane lattice spacing of the commonly available binary substrates, such as GaAs or InP, and is a key advantage of the invention.

An appropriate strain-relieved buffer can be achieved by a number of techniques, the simplest of which is to prepare the buffer layer under thermodynamic equilibrium growth conditions. However, since most efficient epitaxial growth typically occurs away from thermodynamic equilibrium, three alternatives are also possible.

One alternative for the strain-relief buffer consists of two parts, a single ternary alloy layer grown above a short period strained-layer superlattice having the desired in-plane lattice spacing in contact with either the substrate (or with an epitaxial layer having the same lattice spacing as the substrate grown directly above the substrate). This combination strain-relief buffer is grown to an empirically determined thickness such that the stored energy from the lattice mismatch is sufficient to develop misfit dislocations at the buffer-substrate interface at the growth temperatures, and thus relieve lattice mismatch between the buffer and the substrate.

Another alternative is to grow the ternary buffer layer directly contacting the substrate or directly contacting an epitaxial layer of identical lattice spacing as the substrate. As before, this combination is grown to sufficient thickness that the stored energy from the lattice mismatch is sufficient to develop misfit dislocations at the buffer-substrate interface at the growth temperatures, and thus relieve lattice mismatch between the buffer and the substrate. A superlattice of either strained or unstrained layers is then grown above the ternary buffer layer to act as a dislocation filter.

Alternatively, buffer layers of intermediate compositions can be grown with either stepwise-graded or continuously graded lattice constants between those of the substrate and the desired in-plane lattice spacing of the Asymmetric Fabry-Perot device. Again, the layers must be grown to sufficient thickness that the stored energy from the lattice mismatch is sufficient to develop misfit dislocations at the interfaces in the buffer at the growth temperatures, and thus relieve the buffer-substrate lattice mismatch.

In the disclosed example, buffer 40 is a two-part system and includes a single 171 nm $In_{0.115}Ga_{0.885}As$ layer 42 and a short period SLS 44 formed of 100 2 nm layers of $In_{0.23}Ga_{0.77}As$ alternating with 100 2 nm layers of GaAs. The thickness of the buffer layer 40 ensures complete relaxation at the buffer mirror interface to the desired lattice constant, $a_0$.

The use of ternary compositions lattice matched to the a buffer layer allows relatively thick layers to be grown without introducing any additional strain from lattice mismatch. The mirror alloys are labeled as H and L in FIG. 1, indicating the higher refractive index (reduced-bandgap layer, which is 75.3 nm $In_{0.115}Ga_{0.885}As$ for the example) and lower refractive index (greater-bandgap layer, which is 89.1 nm $In_{0.1}Al_{0.9}As$ for the example). Lower mirror 30 consists of 25 layers of L alternating with 24 layers of H. Upper mirror 20 is thinner to permit the passage of light into cavity 10, and consists of 5 layers of H alternating with 5 layers of L, with an L layer adjacent cavity 10.

Although the specific example is shown in the InGaAs-InAlAs materials system, the same procedure applies directly to all other semiconducting ternary phase systems chosen from columns I, II, III, IV, V, VI and VII. Broadly, the invention can be formed of ternary alloys from any three binary materials, A, B, and C, where at least two of the materials, A and B (GaAs and AlAs in the example) have different bandgaps, and the third material, C (InAs, for example) has a different lattice constant from at least one of the other two materials. A few representative materials and are shown in FIG. 1. Both high and low reflectivity mirrors (a function of their bandgaps) must have a lattice constant $a_0$ equal to the unstrained lattice constant of the active cavity, which cavity is formed of strained materials that have unstrained lattice constants that straddle $a_0$.

As shown in FIG. 1, the ternary alloys marked by solid dots are lattice-matched to the buffer and can be used to make the thick, multilayer, quarter-wave stacks required for high-reflectivity mirrors. There are many options for making the active region of the device through the use of multiple strained quantum wells or through the use of a strained-layer superlattice (a periodic structure consisting of multiple, repeated strained quantum wells). The essential element of this aspect of the invention is to match the equivalent in-plane lattice spacing of the active region to that of the unstrained buffer layer and mirror. The active region thus consists of a combination of strained quantum wells and barrier layers of alternating strain in either a multiple quantum-well version or in a strained-layer superlattice version.

The in-plane lattice spacing $a||$, which is $a_0$ in this example, of the alternating-layer combination may be calculated in a manner taught by J. Matthews et al., J. Cryst. Growth 32, 265 (1976).

Figure 2:
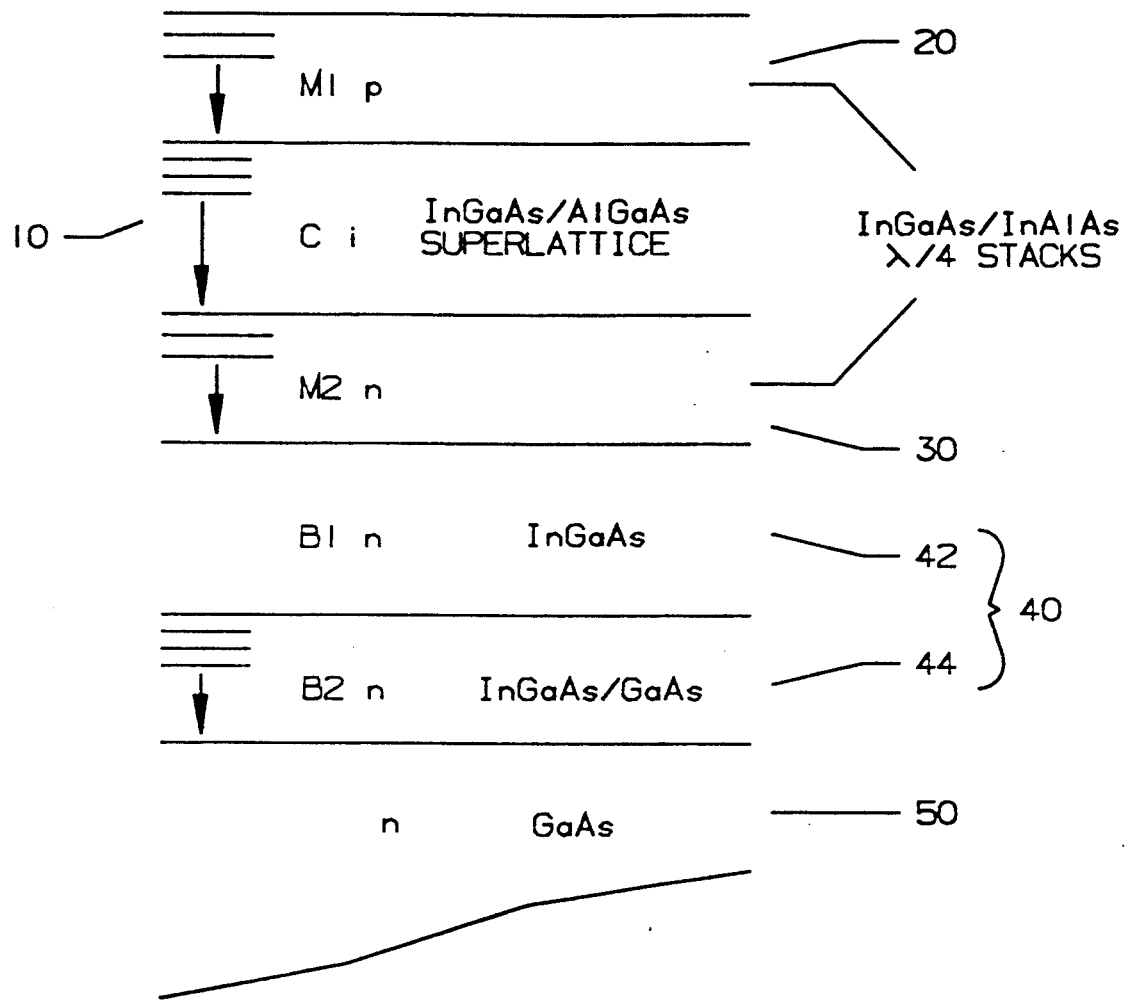
FIG. 2 shows a preferred embodiment of the invention.

To provide for electric-field control of the cavity's optical properties, the device is grown as a p-i-n structure, as indicated in FIG. 2. Device operation at the desired wavelength is achieved by designing the SLS to have the appropriate bandgap, and assuring that the optical path between the two mirror structures corresponds to an appropriate number of half wavelengths at the operating wavelength.

The epitaxial multilayers for the AFP modulator were prepared by computer-controlled molecular-beam epitaxy using wafer rotation during growth in a commercial Riber Model 32P system. The substrates were 2 inch diameter, n-type, (100)-oriented, GaAs wafers. The surface of the completed structure was highly specular, with slight surface crosshatching due to the strain relief buffer. The modulators were fabricated as mesa structures in circular geometries with diameters of 0.1-3.0 mm. Annular top contacts were formed by lift-off processing. The p-type upper mirror 20 and the undoped SLS cavity 10 regions were removed from around the mesas by chlorine reactive-ion-beam etching. Annular contacts of Ge/Au/Ni/Au were then patterned by lift-off processing to surround the bottoms of the mesas. The contacts were alloyed in a rapid-thermal-processing system. The completed devices exhibited excellent reverse current-voltage characteristics, with the best 1 mm diameter devices exhibiting reverse leakage currents of less than 5 $\mu A$ at $-8$ V.

Figure 3:
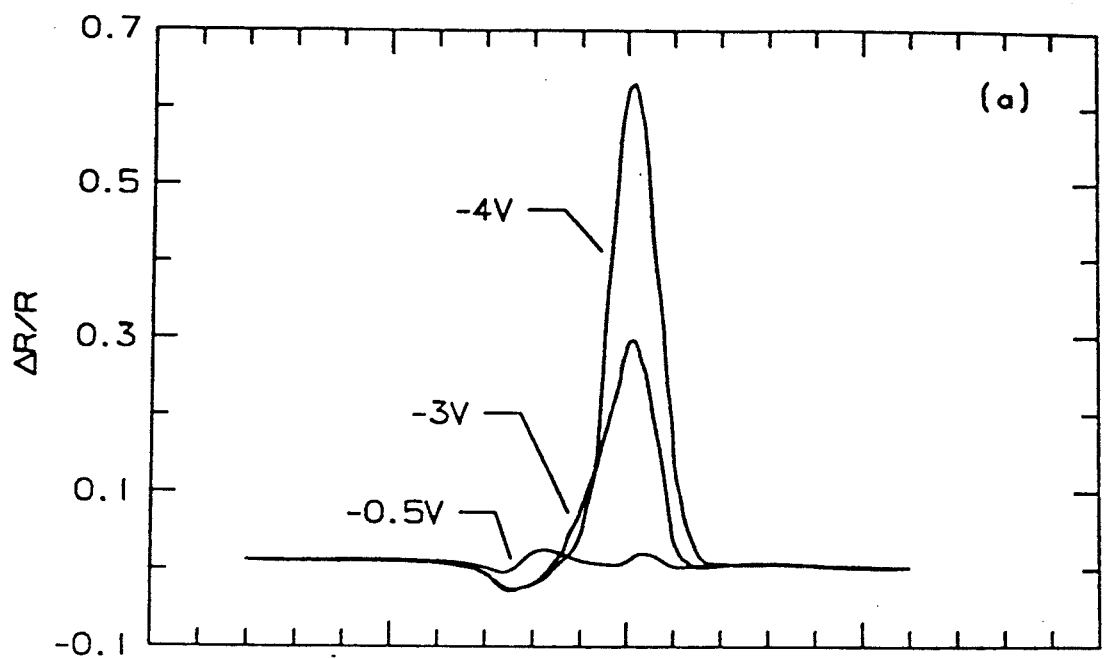
FIG. 3 shows the change in reflectivity as a function of wavelength and bias voltage for the preferred embodiment.
Figure 4:
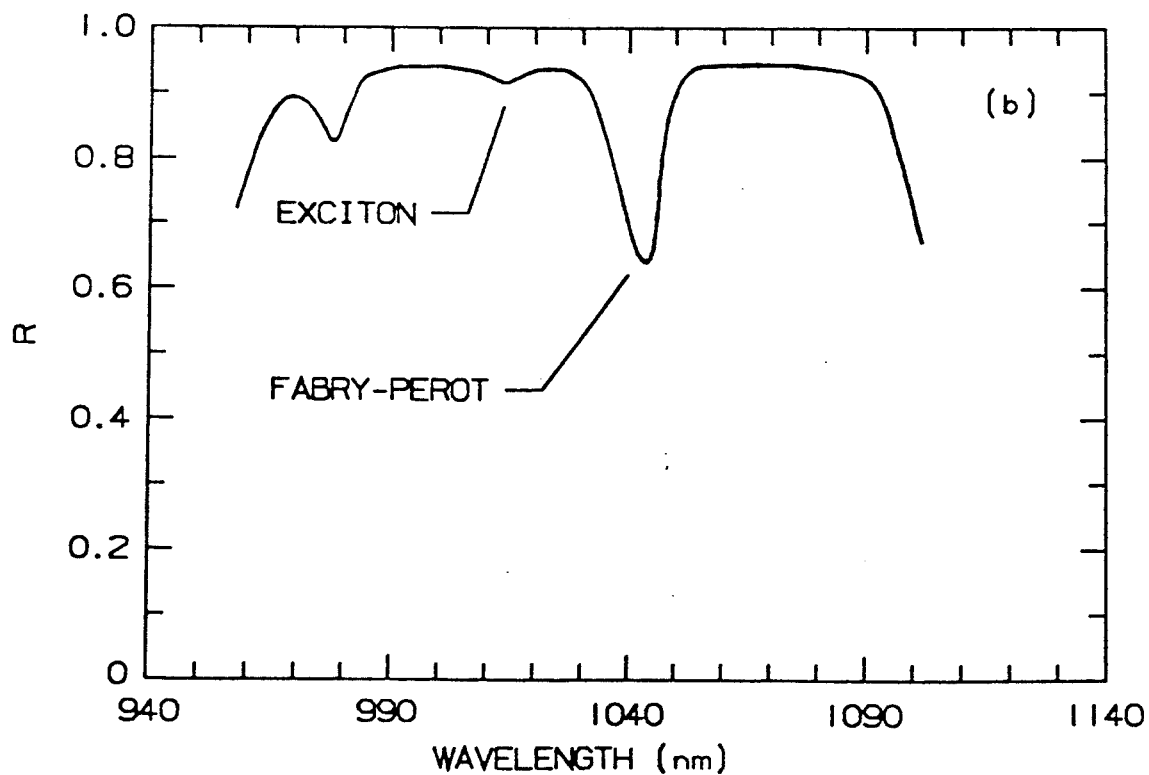
FIG. 4 shows the reflectivity spectrum at +0.5 V bias for the preferred embodiment.
Figure 5:
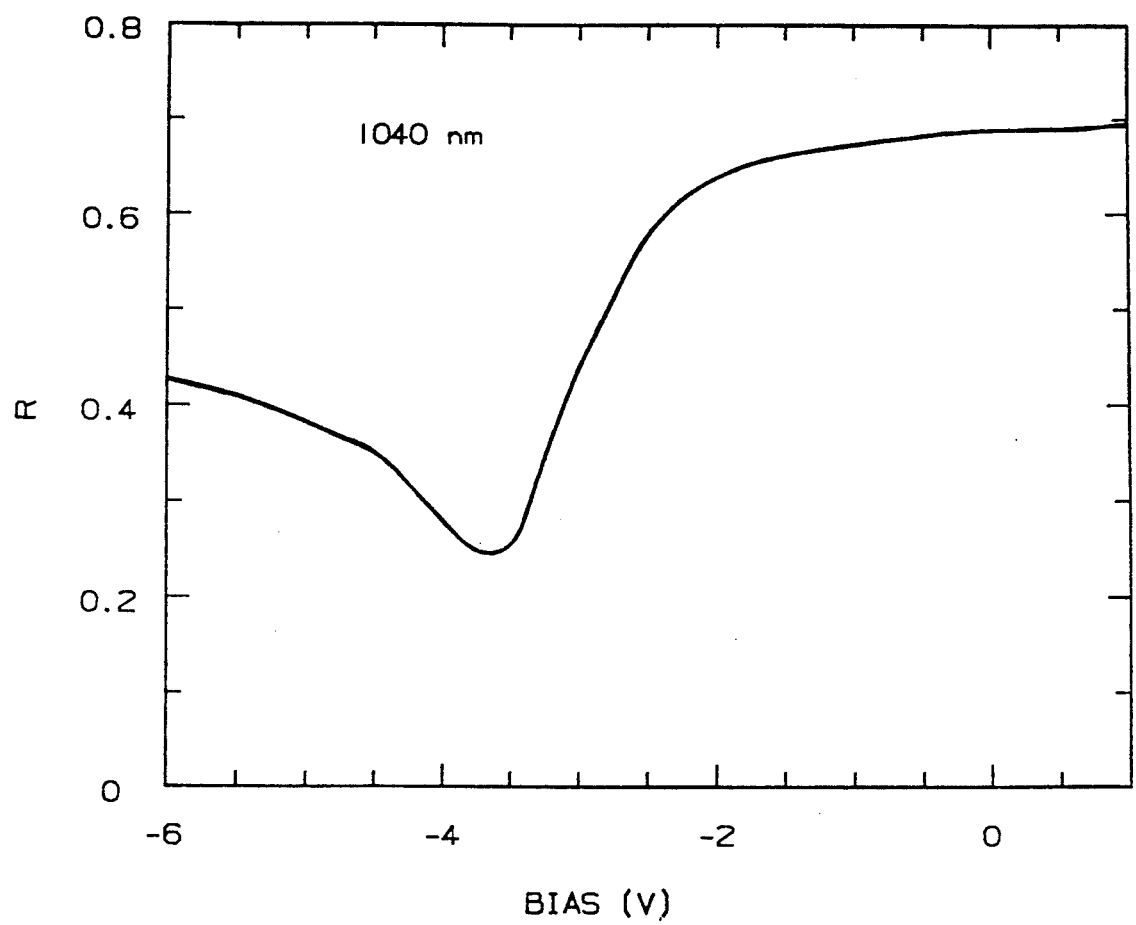
FIG. 5 shows reflectivity as a function of bias voltage at the Fabry-Perot cavity resonance.

Results of measurements of the wavelength-dependent modulated reflectivity of the example are shown in FIG. 4. The reflectivity spectrum at $+0.5$ V forward bias is given in FIG. 4. The high reflectance zone of the mirror stacks extends from 980-1095 nm, and the Fabry-Perot mode is near the center of this zone at 1040 nm, as shown in FIG. 5. A small dip in reflectivity due to the band-edge exciton of the InGaAs/AlGaAs SLS cavity is seen at 1015 nm, the excitonic peak being a well known consequence of the confinement potential provided by the superlattice structure. (D. Miller, et al., Phys. Rvw B32, 1043 (1985). FIG. 3 shows the modulated reflectivity spectrum $\Delta R/R$ for three different levels of modulation. The sign of $\Delta R$ is taken as positive when R increases with increasing forward bias. FIG. 3 also shows the result of modulation to 1 V, where the exciton is moved to coincide with the Fabry-Perot mode.

The peak response shows a fractional modulation of $\Delta R/R = 63\%$. A different device taken from nearer the center of the wafer than the one used for the data described above has slightly thicker layers and a Fabry-Perot resonance at 1050 nm. The exciton for this device is at 1018 nm, so that a larger bias ($\approx -5$ V) was required to superimpose the exciton and the Fabry-Perot mode than for the first sample, leading to a smaller peak response in $\Delta R/R$ ($\approx 50\%$). This result indicates that minor modifications of the design by increasing the In mole fraction in the ternary layers to bring the cavity mode closer to 1.06 $\mu m$ and the exciton mode closer to the cavity mode will lead to greatly improved performance for a target operating wavelength of 1.06 $\mu m$.

Figure 6:
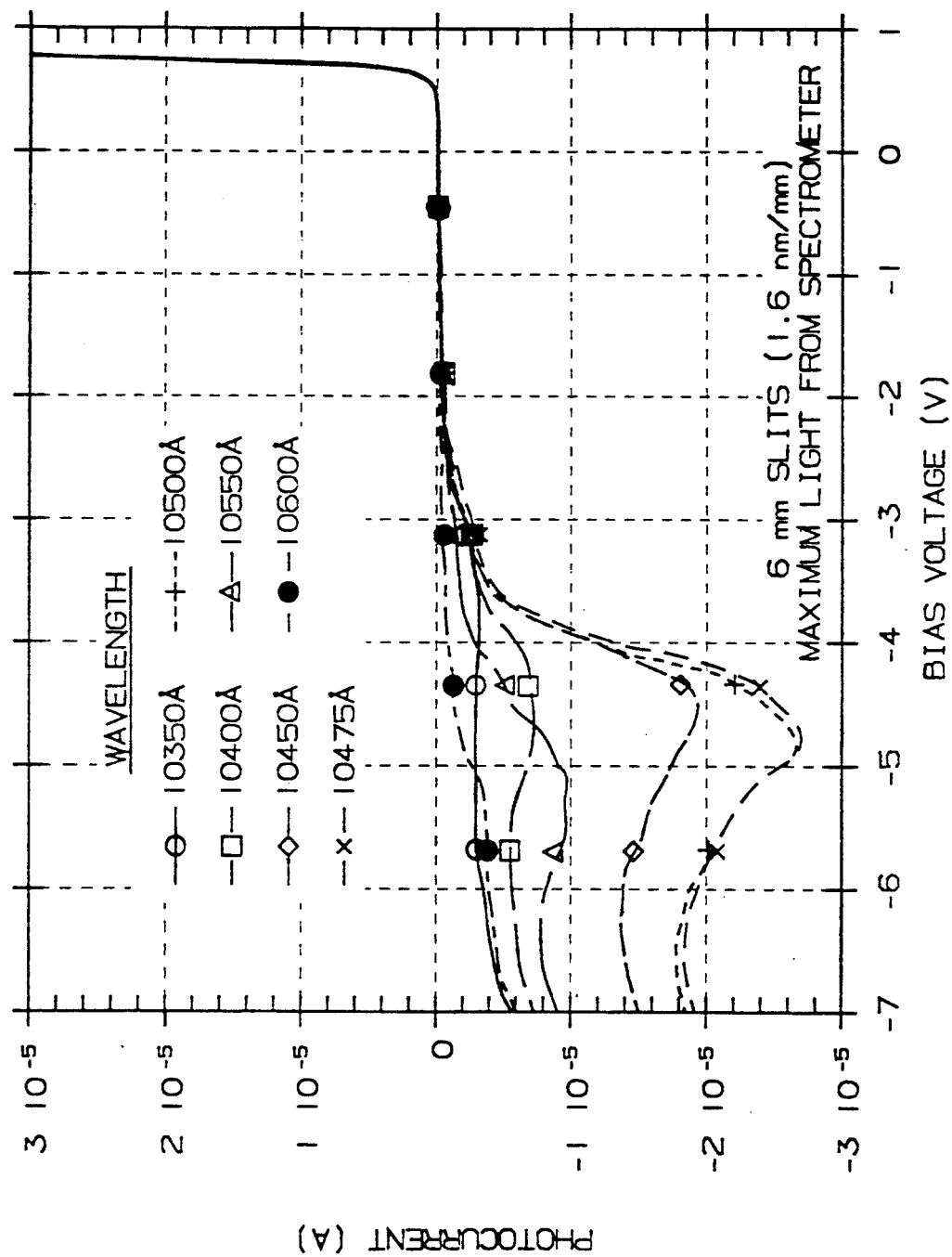
FIG. 6 shows the wavelength-dependent photoresponse of an AFPM as a function of applied reverse bias.

This invention uses an applied electric field to control the quantum-well bandgap; thus, the amount of light absorbed at a given photon energy will be a function of applied bias. Since the absorbed light produces a photocurrent in these reverse-biased p-i-n structures, the photogenerated current for a given wavelength incident on these devices depends on the applied electrical bias. The devices are also photodetectors whose wavelength-dependent photoresponse can be electrically controlled (FIG. 6).

Figure 7:
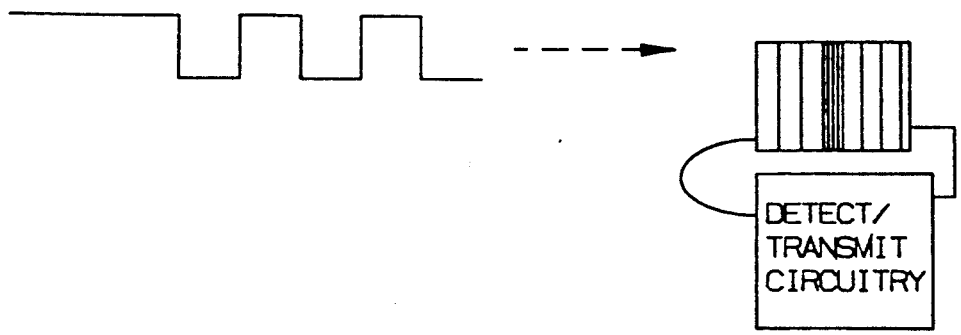
FIG. 7 shows application of the AFP device as a detector/modulator in a bidirecitonal communication system.
Figure 7:
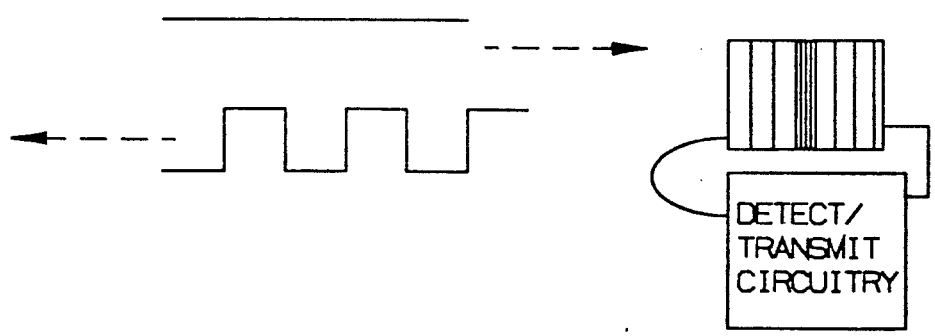

Such photodetectors are ideal for bidirectional optical communications. For example, these devices could be kept under reverse bias at one end of a free-space or fiber-based optical link (FIG. 7). A modulated optical signal supplied to the AFP reflection modulator/photodetector could be sensed by electronics attached to the AFP device. If this "wake-up" optical signal to the electronics on the AFP side of the optical link were followed by constant-intensity optical illumination at the same wavelength, then the information from the AFP side of the optical link could be transmitted to the other end of the optical link by modulating the intensity of the returning light.

This invention demonstrates a reflectance modulator optimized for low insertion loss and operating at wavelengths near 1.04–1.06 $\mu$m. Minor adjustments in the design will allow operation at the 1.06 $\mu$m Nd:YAG laser line. The general design concept can be used for a variety of device applications over a wide range of operating wavelengths by combining strained-layer superlattices of compositions different from those indicated here with the appropriate strain-relieved buffer layers, selecting mirror compositions consistent with the procedure described above.

The particular sizes and equipment discussed above are cited merely to illustrate a particular embodiment of this invention. It is contemplated that the use of the invention may involve components having different sizes and shapes as long as the principles described and claimed herein are followed. It is intended that the scope of the invention be defined by the claims appended hereto.

I claim:

1. An asymmetric Fabry-Perot reflectance modulator (AFPM) consisting of an active region in an optical cavity between top and bottom mirrors, said bottom mirror being affixed to a substrate by a buffer layer, said modulator being formed only from layers of ternary materials resulting from the combination of pairs of three binary materials (A, B, C),
   at least two of said materials, (A, B) having different bandgaps,
   the third material (C) and at least one of said at least two materials (A and B) having different lattice constants, and
   the active region comprising a thermodynamically stable combination of quantum well and barrier layers of alternating strain having a free-standing lattice constant $a_0$ matched to the lattice constant of the mirrors.

2. The AFPM of claim 1 wherein said active region comprises a strained layer superlattice having a free standing lattice constant $a_0$ between the lattice constant of C and A.

3. The AFPM of claim 2 wherein said active region consists of alternating layers of alloyed combinations of A and B and alloyed combinations of A and C.

4. The AFPM of claim 2 wherein each mirror is lattice matched to the in-plane lattice constant of the strained layer active region forming said cavity.

5. The AFPM of claim 4 wherein each mirror consists of a plurality of alternating mirror layers, one layer being an alloyed combination of A and C, the other layer being an alloyed combination of B and C, each of said layers being lattice matched to said cavity.

6. The AFPM of claim 4 wherein said active region consists of alternating layers of alloyed combinations of A and B and alloyed combinations of A and C.

7. The AFPM of claim 2 wherein said buffer layer comprises means for ensuring complete relaxation at the buffer mirror interface.

8. The AFPM of claim 7 wherein said buffer layer consists of a single ternary alloy grown above a short period strained-layer superlattice, the buffer being lattice matched to $a_0$ at the interface with the mirror.

9. The AFPM of claim 1, said modulator operating at a wavelength of 1.06 $\mu$m.

10. The AFPM of claim 1 where A is GaAs, B is AlAs, and C is InAs.

11. The AFPM of claim 2 where A is GaAs, B is AlAs, C is InAs, and $A_0 \approx 5.7$ Å.

12. The AFPM of claim 11 wherein said active region consists of alternating layers of alloyed combinations of A and B and alloyed combinations of A and C.

13. The AFPM of claim 11 wherein each mirror is lattice matched to the in-plane lattice constant of the strained layer active region forming said cavity.

14. The AFPM of claim 13 wherein each mirror consists of a plurality of alternating mirror layers, one layer being an alloyed combination of A and C, the other layer being an alloyed combination of B and C, each of said layers being lattice matched to said cavity.

15. A communication system comprising the AFPM of claim 9 in combination with a Nd:YAG laser for transmitting information to said AFPM.

* * * * *

UNITED STATES PATENT AND TRADEMARK OFFICE
CERTIFICATE OF CORRECTION

PATENT NO. : 5,315,430
DATED : May 24, 1994
INVENTOR(S) : Thomas Brennan et al.

It is certified that error appears in the above-identified patent and that said Letters Patent is hereby corrected as shown below:

On the title page, item [75] Inventors: should read

Thomas M. Brennan
      Ian J. Fritz, both of Albuquerque
      Burrell E. Hammons, Tijeras
      Vincent M. Hietala, Placitas
      David R. Myers,
      Gregory A. Vawter, both of Albuquerque, all of New Mexico Signed and Sealed this Twenty-fourth Day of June, 1997

*Attest:*

BRUCE LEHMAN

*Attesting Officer*      *Commissioner of Patents and Trademarks*